Figure 1:
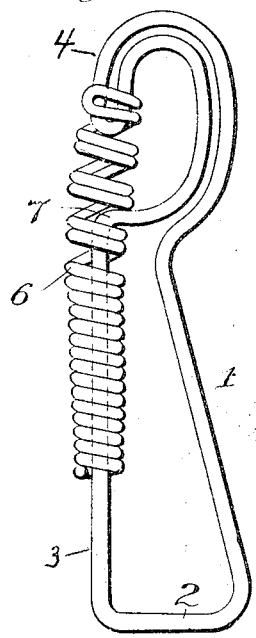

No. 797,897. PATENTED AUG. 22, 1905.
I. N. LAWSON.
FASTENING HOOK.
APPLICATION FILED MAY 3, 1904.

Witnesses:
Jared Stephenson
William W. Chapel

Inventor:
I. N. Lawson

UNITED STATES PATENT OFFICE.

ISAAC NEWTON LAWSON, OF BATES COUNTY, MISSOURI.

FASTENING-HOOK.

No. 797,897. Specification of Letters Patent. Patented Aug. 22, 1905.

Application filed May 3, 1904. Serial No. 206,247.

*To all whom it may concern:*

Be it known that I, ISAAC NEWTON LAWSON, a citizen of the United States, residing in Bates county, Missouri, have invented a new and useful Fastening-Hook, of which the following is a specification.

This invention relates to hooks or fasteners, and more especially to those fabricated for use on harness or the like.

It has particular reference to means whereby the part engaged by the fastener is held securely but detachably thereto.

It is an object of the invention to provide a hook of this character which will operate efficiently without the use of an attached spring.

Another object of the invention is to form the hook so that it will not become fouled in parts not intended to be engaged thereby.

With these and other objects in view the invention contemplates the provision of a fastening device including a hook and a coiled latch coöperating therewith in such manner that the hook can be readily opened or closed at will.

Novel characteristics of the invention will be apparent from the detail description hereinafter when read in connection with the accompanying drawings, forming part hereof, wherein an embodiment of the invention is delineated for purposes of illustration.

In the drawings like reference characters refer to corresponding parts in both views, of which—

Figure 2:
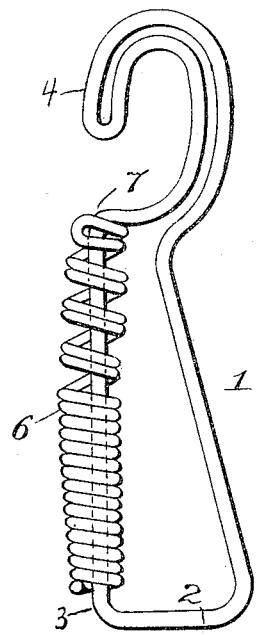

Figure 1 illustrates one embodiment of the invention, the coiled latch being shown in closed position; and Fig. 2 illustrates the same embodiment of the invention, the latch being shown in open position.

Referring more particularly to the drawings, 1 designates a fastener formed in accordance with my invention, preferably out of wire, for harness or other use.

The material is bent to form a lateral shank 2 for attachment to a strap or other part, and from shank 2 the material is bent to form a central shank and to converge and to terminate in a hook 4, an open space being left between the material extending from the lateral shank to the hook. Around one of the portions 3 of the central shank a latch 6 is coiled, the latch being formed of wire or other suitable material bent upon itself and coiled in double strands, which for part of the length of the latch are separated or open.

The material forming the fastener is bent opposite the end of the hook so as to form a shoulder 7, which is engaged by the open coils of latch 6, said coils acting as a screw on said shoulder. By turning the latch it is caused to move toward or from the end of the hook to close or open the same, the latch being so disposed that when it closes the hook it envelops the end thereof, thus making a complete closure.

Having thus described my invention, what I claim as new, and desire to secure by Letters Patent, is—

1. A fastener comprising material bent to form a hook and a shoulder opposite the end of said hook, and a latch disposed on a member formed downwardly from said shoulder, said latch comprising material coiled around said member, and the coils thereof being arranged to impinge on said shoulder and engage the end of said hook.

2. A fastener comprising material bent to form a hook and a shank terminating in a shoulder, and a latch disposed on said shank, said latch comprising material coiled around said shank, and the coils thereof being arranged to impinge on said shoulder and engage the end of said hook.

3. A fastener comprising material bent to form a hook and a shank terminating in a shoulder opposite the end of said hook, and a latch disposed on said shank, said latch comprising material coiled around said shank, and the coils thereof being arranged to impinge on said shoulder and engage the end of said hook.

4. A fastener comprising material bent to form a hook and a shank terminating in a shoulder, and a latch disposed on said shank, said latch comprising material closely coiled for part of the length and the coils of which are separated for part of the length, the separated coils being arranged to impinge on said shoulder and engage the end of said hook.

April 30, 1904.

ISAAC NEWTON LAWSON.

Witnesses:
A. P. STROUP,
A. M. BROWNLEE.